April 24, 1934.    E. RUPP    1,956,544

ELECTRIC CURRENT RECTIFIER

Original Filed Nov. 11, 1932

Inventor:
Emil Rupp,
by Harry E. Dunham
His Attorney.

Patented Apr. 24, 1934

1,956,544

UNITED STATES PATENT OFFICE 1,956,544

ELECTRIC CURRENT RECTIFIER

Emil Rupp, Berlin-Frohnau, Germany, assignor to General Electric Company, a corporation of New York Original application November 11, 1932, Serial No. 642,325. Divided and this application March 16, 1933, Serial No. 661,189. In Germany November 14, 1931

2 Claims. (Cl. 175—366)

This application is a division of my copending application Serial No. 642,325, filed November 11, 1932. The latter application, Serial No. 642,325, is a continuation-in-part of my application Serial No. 637,355, filed October 11, 1932.

My invention relates to electric current rectifiers of the dry plate or contact type, particularly to rectifiers of this type comprising metallic elements having an active layer formed thereon constituted by an oxide of the metallic element, and has for its principal object the provision of a rectifier of high efficiency in which the active layer is constituted by a tungsten oxide formed on a tungsten element.

I have found that the blue tungsten oxide which may be formed on tungsten metal at high temperatures possesses a high rectifying effect. In accordance with the invention disclosed in the aforesaid application Serial No. 637,355, such a rectifying substance is used in the making of dry rectifiers. The present invention is an improvement upon rectifiers of this kind, as will be more fully explained hereinafter.

The method of making the tungsten oxide rectifier in accordance with my invention consists in heating blank tungsten at temperatures of 800° to 1200° C. in an oxygen-containing atmosphere for a certain time. The blue tungsten oxide which is formed in this case has (in contrast to the yellow tungsten oxide) a very pronounced rectifier effect. Unlike other rectifier substances, this substance has a very slight internal resistance, and the rectified currents are therefore very high.

My invention will be better understood from the following description when considered in connection with the accompanying drawing and its scope will be pointed out in the appended claims.

Figure 1:
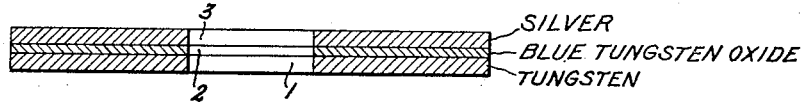

Referring to the drawing, Fig. 1 is a cross-sectional view of a rectifier of the dry plate or contact type in accordance with my invention, and Figs. 2 to 6 are cross-sectional views of modifications of the invention.

In Fig. 1 the rectifier unit of the dry plate type comprises a tungsten element or plate 1, having thereon an active layer 2 of blue tungsten oxide, and a conductive element or plate 3 in contact with the oxide layer. In the present embodiment of my invention the latter element or plate 3 is formed of silver.

Figure 2:
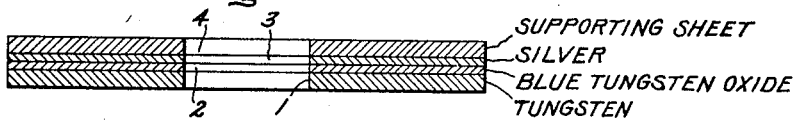

In Fig. 2 the construction of the rectifier unit is the same as that illustrated in Fig. 1 except that in Fig. 2 the silver element 3, in contact with the active blue tungsten oxide layer 2, is in the form of a thin layer on a supporting sheet 4 of any other suitable material.

Figure 3:
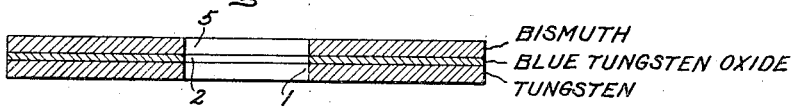
Figure 4:
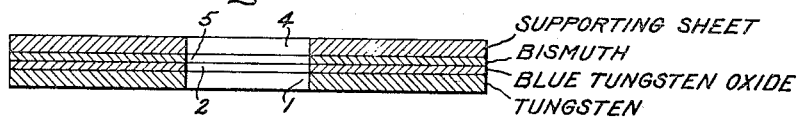

In Figs. 3 and 4 the rectifier unit is the same as illustrated in Figs. 1 and 2 respectively except that in the modification shown in Figs. 3 and 4 the conductive element or plate 5 is formed of bismuth.

Figure 5:
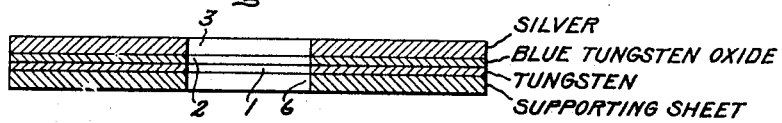
Figure 6:
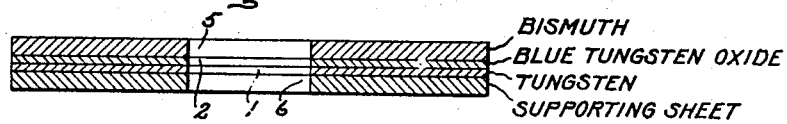

In Figs. 5 and 6 the rectifier units are the same as those shown in Figs. 1 and 3 respectively except that in the modifications illustrated in Figs. 5 and 6 the tungsten element 1 is in the form of a thin layer on a supporting sheet 6 of suitable material.

Following is a description of a few of the special methods which I have found suitable for the production of the blue tungsten-oxide layer:

1. Blank tungsten in sheet form may be heated in air at 950° C. and for a few minutes (three to five for example), after which the tungsten is quenched in water. The quenching makes it possible to obtain the blue layer alone, without the yellow oxide. The quenching itself can take place in heated water, or in heated as well as in cold oil.

2. Blank tungsten in sheet form may be heated as in case 1 above, in a stream of nitrogen and in a carbon-dioxide stream, after which it may be cooled in a stream of carbon-dioxide.

3. Blank tungsten in sheet form may be heated in oxygen at a reduced pressure, after which it is quenched.

4. After undergoing any one of the processes described under cases 1 to 3 above, the blue layer may be tempered or treated at 300° to 600° C. in an atmosphere which contains a slight amount of oxygen, for instance carbon-dioxide.

It is to be noted that the tungsten sheets may be formed in any suitable shape; for example, the sheets may be cut into rings.

When making rectifiers in accordance with my invention the parent metal sheet of oxide-coated tungsten serves as one electrode and the other electrode may be made of any other metal. In the aforesaid parent application Serial No. 637,355, it is stated that lead and zinc are quite appropriate for the latter purpose since they may be sprayed on to the oxide-coated tungsten sheet, and that the metal deposit constituting this other electrode may be also of electrolytic nature.

I have found, however, that it is preferable in certain cases in order to ensure, with more certainty, long life for the dry rectifier that it is of advantage to employ silver and bismuth as material for the other, or cooperating electrodes. For this purpose sheet silver, or sheet bismuth, or bismuth which is applied to a supporting sheet of other metal in a thin coating, is given a high polish and applied by pressure to the tungsten oxide layer. The use of bismuth as a contact metal, or metal for the cooperating electrode, offers, furthermore, the advantage that the blocking potential of the rectifier is higher than in the case of other metals employed for this purpose, so that a smaller number of cells is required for the purpose of charging storage batteries or for analogous uses.

In order to prevent a further oxidation of the blue tungsten layer, reducing media may be used such as lead oxide and graphite.

Instead of using solid tungsten sheets, another metal may be employed as a supporting sheet. For example nickel sheets may be employed which may be plated with tungsten, the tungsten layer then being oxidized to form the active layer thereon.

It is to be noted that the rectifying layer exhibits also a photo-electric sensitivity and may be used as a "back-wall" as well as a "front-wall" photocell.

What I claim as new and desire to secure by Letters Patent of the United States, is:

1. The process of forming a dry rectifier comprising a tungsten element having a layer of blue tungsten oxide thereon which includes applying a layer of bismuth to said tungsten oxide layer.

2. The process of forming a dry rectifier comprising a supporting metal sheet and a tungsten sheet having a layer of blue tungsten oxide thereon which includes applying a layer of bismuth to said supporting sheet, and applying said bismuth coated sheet to said tungsten oxide layer.

EMIL RUPP.